_(12)_ United States Patent
Kamaishi et al.

(10) Patent No.: US 6,479,570 B2
(45) Date of Patent: Nov. 12, 2002

(54) AGGREGATE, MANUFACTURING PROCESS THEREOF, AND RESIN MORTAR

(75) Inventors: Tadami Kamaishi, Otsu (JP); Kiyokata Ishii, Urayasu (JP); Hideharu Osada, Nara (JP)

(73) Assignees: Toray Industries, Inc., Tokyo (JP); Toray Fine Chemical Co., Ltd., Chiba Prefecture (JP); Osada Giken Co., Ltd., Osaka (JP)

( * ) Notice: Subject to any disclaimer, the term of this patent is extended or adjusted under 35 U.S.C. 154(b) by 0 days.

(21) Appl. No.: 09/742,068

(22) Filed: Dec. 22, 2000

(65) Prior Publication Data

US 2001/0020058 A1 Sep. 6, 2001

(30) Foreign Application Priority Data

Mar. 1, 2000 (JP) ........................................ 2000-055415

(51) Int. Cl.[7] .............................. C08K 9/00; C08K 3/26; C08K 3/34
(52) U.S. Cl. .................... 523/205; 523/209; 428/411.1; 524/2; 524/425; 524/492
(58) Field of Search ...................... 428/411.1; 523/205, 523/209; 524/2, 425, 492

(56) References Cited

U.S. PATENT DOCUMENTS 6,231,460 B1 * 5/2001 Higuchi et al. ............. 473/374

* cited by examiner

*Primary Examiner*—Kriellion A. Sanders
(74) *Attorney, Agent, or Firm*—Armstrong, Westerman & Hattori, LLP

(57) ABSTRACT

The invention provides: an aggregate comprising a core made of an elastic material and a surfacing material adhered thereon by use of a resin; a manufacturing process of the novel aggregate comprising such steps as mixing 100 parts by weight of a core made of an elastic material with 0.1 to 20 parts by weight of a resin to cause the resin to stick uniformly on the surface of the core, and thereafter, contacting and mixing the core with 1 or more part by weight of a surfacing material having one-tenth or less average particle diameter of that of the core; and a resin mortar mixing the novel aggregate, a resin and preferably other additives.

23 Claims, 2 Drawing Sheets

AGGREGATE, MANUFACTURING PROCESS THEREOF, AND RESIN MORTAR

BACKGROUND OF THE INVENTION

1. Field of the Invention

The present invention relates to an aggregate mixed for use with a set-hard material.

2. Prior Art

Cement and asphalt are usually called a "set-hard" material which may be filled or applied, during its having fluidity, in a predetermined shape or a plane to be caused to set hard naturally or with a predetermined means.

The set-hard materials are usually mixed with an ordinary aggregate consisting of inorganic particles for obtaining an increased quantity or for making lightweight, reinforcing, or improving troweling (workability). The ordinary aggregate to be mixed in an asphalt mixture may be usually macadam (crushed stones), sands, and stone powder, or, for a special use, silica sand or ceramics aggregate. The ordinary aggregates to be mixed in cement concrete may be similarly macadam and sands, or, for a special use, silica sand or the like. Those to be mixed in resin mixture may be silica sand, ceramics aggregate, or organic aggregates.

These conventional aggregates having rigidity or stiffness make stiff the whole of the set-hard material and cause the same to have no softness. Even in case that the set-hard material itself has softness to some extent, it becomes rigid as a whole when the aggregate has rigidity. Moreover, an actual situation may require a set-hard material having softness to some extent, for example, for pavement or particularly a playground which is to be soft to some extent for absorbing the impact to players feet. An aggregate material usable in such case may be rubber having flexibility or pliability to make soft or pliable the whole of the set-hard material, satisfying the foregoing need.

In recent years, rubber chips are mixed as aggregate in an asphalt mixture to provide the same with elasticity. Furthermore, rubber or plastic materials are used as aggregate for concrete to make it lightweight.

However, the rubber chips aggregate lower in the set-hard material completely or partially. Strength of the whole set-hard material is apparently or definitely influenced by adhesion between the set-hard material and aggregate. In detail, when adhesion between the set-hard material and aggregate is low, crack occurs between the set-hard material and aggregate, causing the aggregate to fall. The aggregate exposed to the outside from the set-hard material falls off (peels off and scatters) under the foregoing condition of low adhesion.

Rubber chips aggregate, which are pliable, when used for pavement has such defect as making impossible or quite difficult to trowel or rolled-fill. Namely, the pliable rubber chips aggregate cannot be smoothly applied by troweling, or, do not go into every corner (predetermined positions) even by pressuring to then deform there and recover after releasing of the pressuring force. This means that rubber chips cannot be tightened and stiffened (compacted) by pressuring and have a quite poor workability.

As a result, any elastic material hitherto cannot be put into practical use as the aggregate material.

SUMMARY OF THE INVENTION

An object of the present invention is to provide a novel aggregate which uses an elastic material as an aggregate material and eliminates the defects shown in the conventional elastic aggregate.

The present invention provides: an aggregate which is mixed for use with a set-hard material and comprises a core made of an elastic material and a surfacing material adhered thereon by use of a resin; a manufacturing process of the novel aggregate comprising such steps as mixing 100 parts by weight of a core made of an elastic material with 0.1 to 20, preferably 0.5 to 10 parts by weight of a resin to cause the resin to stick uniformly on the surface of the core, and thereafter, contacting and mixing the core with 1 or more part by weight of a surfacing material having one-tenth or less average particle diameter of that of the core; and a resin mortar mixing the novel aggregate, a resin and preferably other admixtures.

DETAILED DESCRIPTION OF THE INVENTION

The set-hard material referred to herein may be cement such as concrete, an asphalt mixture, an asphalt emulsion, a resin, or resin mortar, which have plasticity and can be caused to set hard.

The core is a main body of the aggregate according to the present invention and the core part itself is just the aggregate in the conventional art. Materials for the core may be any elastic materials, for example, synthetic organic high polymeric substances such as rubber or plastics, or fibers of plants or animals. Elastic plastic solid called industrial wastes may be usable. Sizes and shapes of the core may be determined depending upon kinds or use of the set-hard material. Usually, average particle diameters of the core may be about 0.2 to 30 mm, preferably 2 to 20 mm. The average particle diameter 0.2 to 2 mm may be most preferable when the aggregate is used as a resin mortar to be filled in gaps among aggregates in a draining (water-permeable) asphalt pavement (described later). Shapes of the core may be spherical, flat, crushed or fiber-like. The core may employ crushed waste tire, whereby reducing cost to produce and having effect of disposing wastes (recycling) and mitigating environmental problems.

Adhesives to be applied on the core may use those which have function of sticking the core to a surfacing material described later. Fixing or sealing does not necessarily need sure adhesive-bonding and may sometimes be merely bonding with some degree of force since a force high enough to peel off the surfacing material from the aggregate surface and scatter the same is inherently not applied in the set-hard material. Hence, adhesive-bonding or sticking will do. To make more effective the elasticity of the core, adhesives which have some recovery property from deformation after setting hard may be usable.

Examples of the adhesives are urethane resin, epoxy resin, ethylene-vinyl acetate resin, vinyl chloride resin, acrylic resin (MMA resin, etc.,), or polyester resin. The adhesives may be mixed with solvent for making solution of solid polymer or modifying viscosity.

Putting the adhesive on the core may be carried out in such ways as spraying, coating, soaking, or agitating inside a container. Thickness of adhesive put on may be in an extent enough to fix the surfacing material and does not necessarily need to be thicker.

Surfacing material may employ particles or powder of silica sand, cement powder, calcium carbonate, silica, ceramics, microballoons, inorganic powder such as crushed concrete powder, organic powder such as crushed plastic products, or industrial wastes powder such as constructional wastes. Shapes of the materials may be powdery, particles-like, or in any odd or distorted shapes, or elongated like fibers or impalpable powdery such as fly ash. It is because chemical quality or reaction is not necessarily required in this case but physical existence and shapes are pursued first, through it is preferable that the material interlocks chemically. Sizes of the surfacing materials may be about 0.01 * to 1 mm, or further larger depending upon the cores sizes, and may be determined in correlation with the cores. Fibers or the like may be usable in length of the same order of the cores diameter (the longest diagonal line). The surfacing material may be used in a single kind or a plural kinds, for example, those in a larger size may be first fixed or sealed on the core, and thereafter, smaller surfacing materials fixed partially or locally, thereby providing the whole of aggregate with a larger uneven surface. Particularly, fiber-like materials may be used for providing a larger surfacing material, enabling high resistance when the aggregates fall.

Fixing the surfacing materials on the cores putting adhesives thereon may be freely carried out by covering the core with the surfacing material, for example, by rolling the cores coated with adhesives over the surfacing material, spraying the surfacing material over the cores, or placing the cores in a container having the surfacing material and agitating the cores. Fixing the surfacing material may be carried out simply to merely cause the surfacing material to be put on the entire circumference of the cores, without fixing excess, while exposed adhesive naturally puts thereon the surfacing material. After fixing operation, excess of the surfacing material may be removed by use of a sieve. The fixing operation (process) of the surfacing material and the adhesive may be once or plural times. After application of the adhesive, larger and smaller surfacing materials may be mixed and put on. The surfacing material particles having larger sticking area with respect to their weight tend to be put on the adhesive surface in advance. Upon covering, with the surfacing material, the cores circumference after applied with adhesive, such fact does not necessarily occur that a single layer of the surfacing material uniformly cover the entire surface of aggregate. In detail, some surfacing material particles may lower (or be buried) in the adhesive. In the present invention, all the surfacing material particles may be buried in the adhesive. But, in case that a part of the surfacing material particles positioned at the outermost surface portion of aggregate is adapted to be not covered with the adhesive, physical or chemical qualities of the surface of the surfacing material may be effectively made use of to facilitate adhesion with the set-hard material. Furthermore, the adhesive and the surfacing material sticking thereto or buried therein form or produce resin mortar and wrap the cores surfaces, like eggs shells or leather bags, thereby reinforcing the aggregate.

Blasting after fixing the surfacing material (single kind, of larger and smaller two kinds, or of plural kinds) on the cores may be carried out to remove a part of the surfacing material to provide a larger unevenness on the aggregate surface. Blasting may be carried out by collision of small particles at high speed on the aggregate surface, or alternatively, by collision of respective mixtures of the blasting particles and aggregates at high speed, or collision of the mixtures on the surface of any solid substances. Otherwise, styrol foam which dissolves or deforms with organic solvent may be mixed and used as a part of the surfacing material particles to readily provide unevenness on the aggregate surface by treatment of solvent.

The aggregate according to the present invention provides as foregoing that the surface of the core having elasticity is reinforced by the surfacing material, thereby improving workability and enabling rolled-fill. In detail, the aggregate shows a sufficient rigidity against a force required for applying the set-hard material and the rolled-fill operation, and exhibits flexibility against a larger load. Besides, the set-hard material as a whole but not the specific aggregates shows flexibility.

Next, the manufacturing process of the aggregates according to the present invention (claims 7 and 8) will be referred to. First, 100 parts by weight of a core in a suitable size is mixed with 0.1 to 20, preferably 0.5 to 10 parts by weight of an adhesive to cause the adhesive to stick uniformly on the surface of the core, and thereafter, contacting and mixing the core with 1 or more part by weight of a surfacing material having one-tenth or less average particle diameter of that of the core. In this case, when the adhesive is less than 0.1 part by weight, there provides poor adhesion, and more than 20 parts by weight notably reducing the effect of elasticity of the cores. Although the "average particle diameter" is referred to above, the cores and surfacing materials do not necessarily need to be spherical. The average particle diameter of any shapes other than spherical ones may use or refer to rough sizes.

Next, use of two kinds of, i.e., larger and smaller, surfacing materials will be explained. The adhesive may be applied on the cores similarly to the foregoing manner. Then, a larger (or a first) surfacing material is first put on the whole surface or locally thereof of the cores, followed by applying the adhesive again, thereafter a smaller (a second) surfacing material is put on the core surface. Reversely, the smaller (second) surfacing material may be first put on, followed by application of adhesive again, then the larger (first) surfacing material is put on the whole surface or partially thereof of the cores. According to these methods, in comparison with the case using a single kind of surfacing material, a larger unevenness may be provided on the aggregate surfaces to be excellent in frictional resistance or resistance against drawing.

Next, the resin mortar according to the present invention will be detailed.

The resin mortar referred to herein comprises a mixture of a resin serving as a binder and the aggregate according to the present invention. The resin may employ those suitable for application of the resin mortar, such as urethane resin, epoxy resin, or acrylic resin (MMA resin, etc.). The resin mortar disclosed in claims 9 to 14 may contain other additives, for example, hardening accelerator, pigments, ultraviolet absorbent, rigid aggregate (stones, fine aggregates, etc.), silica, calcium carbonate, talc, stone powder, carbon black, alumina, cement powder, slug powder, or the like.

The resin may be preferably hydraulic to make reaction and harden under existence of water.

The hydraulic resin is a resin which does almost not undergo prevention of hardening even when the resin, before hardening, contacts with water. The present invention may use any resin having such properties, for example, most preferably, a resin modified with polysulfide as containing one or more units each having S on the main or side chain. Since polymer is a mass of various molecular weights and S content may be different in specific monomer units, an average quantity of S may be about 0 to 3 per unit.

In more detail, the preferable resin may contain in the main or side chain such group of —X— ($R_1$—Sa)b—$R_2$—Y— (polysulfide chain) wherein $R_1$ and $R_2$ are di-methylene group (—$CH_2$—), dimethyl ether group (—$CH_2OCH_2$—), di-isopropanol group (—$CH_2CH(OH)CH_2$—), diethanol group (—$CH_2CH(OH)$—), or (—$CH_2CH_2OCH_2OCH_2CH_2$—), (—$CH_2CH_2O$—). These groups may be used solely or plurally or in combination, and $R_1$ and $R_2$ may be the same or different to each other.

X and Y are those to be selected among the groups —S—, —O—, and —NH—. "a" is an integral number of 0 to 5 for each repeating unit, and "b" of 1 to 50. In case that "a" is 0 for all the respective repeating units, at least one of X and Y is a group —S—. "a" is preferably 1 to 2.5.

The foregoing polysulfide chain may be enough to be contained in the resin structure. Synthesizing process may be performed, in case of using epoxy group, by addition reaction between monomer or oligomer (including prepolymer) containing sulfur having a reacting functional group, and epoxy prepolymer having more than two epoxy groups in the molecules, or addition reaction, for example, between polysulfidepolythiol and epoxy prepolymer. In case of using urethane, one-pack type urethane may be enough to contain polysulfide chain on the main chains of a part or the whole of the molecules, and two-pack type to contain similarly polysulfide chain in prepolymer and/or hardening agent. In case of two-pack type, polysulfide resin (ending with SH) itself may serve as hardening agent.

Next, uses of the resin mortar will be detailed.

The resin mortar may be water-permeable or non-water-permeable depending upon various applications, which is adjustable by changing the mixing ratio of the aggregate according to the present invention and the resin. When the present aggregate/resin ratio is about 3 to 5 or more (which may be influenced or varied by true specific gravity of the aggregate and resin and the aggregates sizes), the resin mortar mostly becomes water-permeable.

The resin mortar may be used first for pavement and is most suitable for the so-called paving resin. The resin mortar can be applied to pavement having elasticity, such as a sidewalk, a playground, an athletic ground (a tennis court, a baseball field), pavement on steel plates of bridges, and ordinary roads. For these application, the resin mortar may be enough to be coated, applied or sprayed. Since the circumference of the elastic cores are covered with the tough surfacing material layers, trowelling (manually or mechanically) can be carried out with an excellent workability in comparison with a case using the conventional merely soft aggregate, and also, rolled-fill is available to enable using the same paving method as the case using the conventional rigid aggregates. Furthermore, extent of scattering of the aggregate can be regulated thanks to difference between the surface structures based on specific fixing features of the surfacing materials.

For paving, pliability or flexibility, sizes and quantities of the elastic aggregates may be properly selected to adjust coefficient of elasticity and rebound, and impact to feet and provide a countermeasure for preventing noises generated by cars, etc.

After making pavement with the resin mortar, the surface may be subjected to blasting, thereby removing a hard part with the impact and partially exposing the aggregates having elasticity, whereby providing a road surface having soft aggregates projecting (a few mm) locally. If the road surface is frozen, ice can be readily broken by load of tires of cars to be scattered and removed, which feature mitigates occurrence of accidents of cars through slippage on the frozen road surface.

The resin mortar (water-permeable or non-water-permeable) may be filled in gaps among the aggregates in asphalt pavement (water-permeable or non-water-permeable). In this case, the aggregates in smaller sizes are naturally applied. The resin mortar is to be filled in the gaps among aggregates for preventing asphalt aggregates from being scattered, and for reinforcing the asphalt pavement. In case that asphalt pavement is water-permeable, effects of preventing clogging and reducing noises can be obtained.

Moreover, since the aggregates of the resin mortar have pliability, impact resistance and wear resistance become high. For example, if water containing sand is continuously flowed on the application surface, such surface using rigid aggregates wear early or quickly. The resin mortar may be applied, by making use of this quality, on the part of dam where water flows, bottoms and inner sidewalls of rivers, thereby improving wear resistance and enabling a long life.

Next, the resin mortar may be molded to set hard, for example, in a block or plate-like shape, which as it is can be easily applied, by coating, piling up, or mounting, on the foregoing objective surface to be applied with the invention.

PREFERRED EMBODIMENTS OF THE INVENTION

Next, the present invention will be further detailed with referring to the examples shown in the attached drawings.

Figure 1:
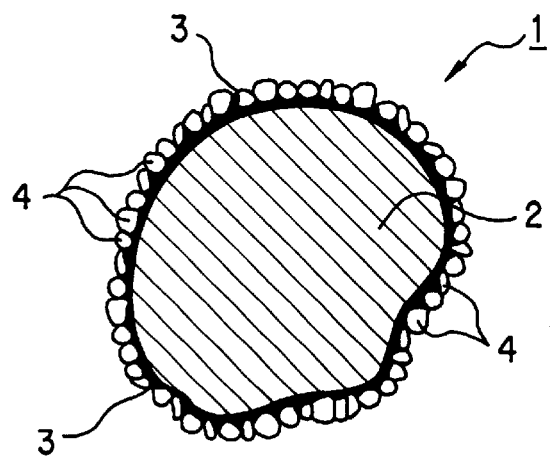
FIG. 1 is a sectional view showing an example of an aggregate according to the present invention.

FIG. 1 is an enlarged sectional view of an aggregate 1 according to the present invention. A powder member (a surfacing material) 4 sticks to and covers the circumference of a core 2 via an adhesive 3. In this example, the core 2 employs rubber chips, and the adhesive 3 urethane resin, and the powder member 4 silica powder. Rubber chips are in size of about 0.5 to 2 cm. The powder member in this example is a single layer and so uniformly sticks to the core 2 that there is almost no powder member 4 completely lowered or buried in the adhesive 3.

Figure 2:
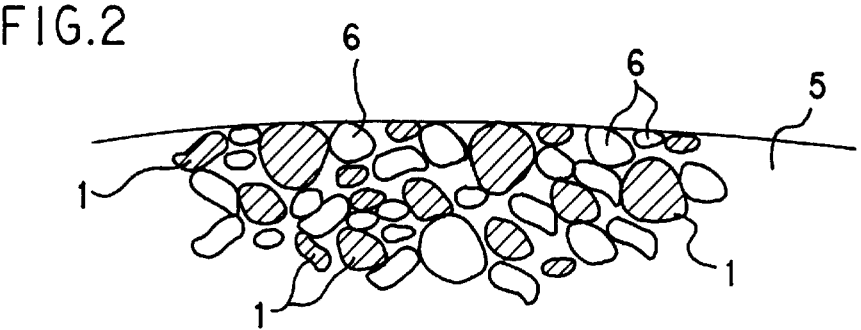
FIG. 2 is a sectional view showing the use of the aggregate according to the present invention.

FIG. 2 is a sectional view showing a road surface 5 paved using asphalt mixture mixing the aggregate 1. Asphalt may naturally mix or contain ordinary aggregates (stones, etc.) 6. This example has a water-permeable structure as a whole.

Figure 3:
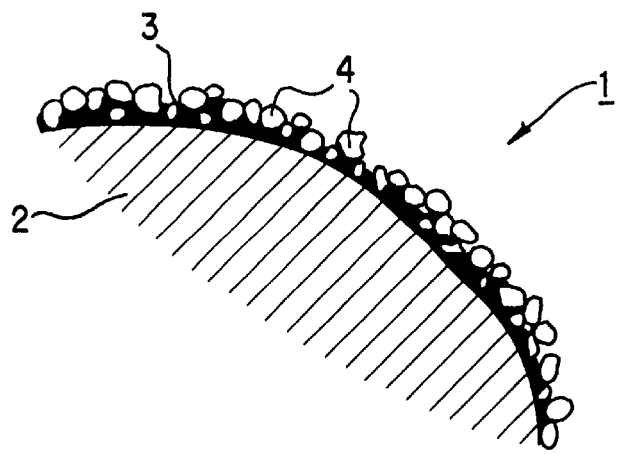
FIG. 3 is a partial sectional view showing another example of the aggregate of the present invention.

FIG. 3 is a partial sectional view showing another example of the aggregate according to the present invention. This example shows that the powder member 4 (the surfacing material) does not uniformly stick, as a single layer, to the core 2, and some of the powder member 4 lower or are buried in the adhesive 3. The surfacing material placed on the outermost layer is not covered with the adhesive in this example.

Figure 4:
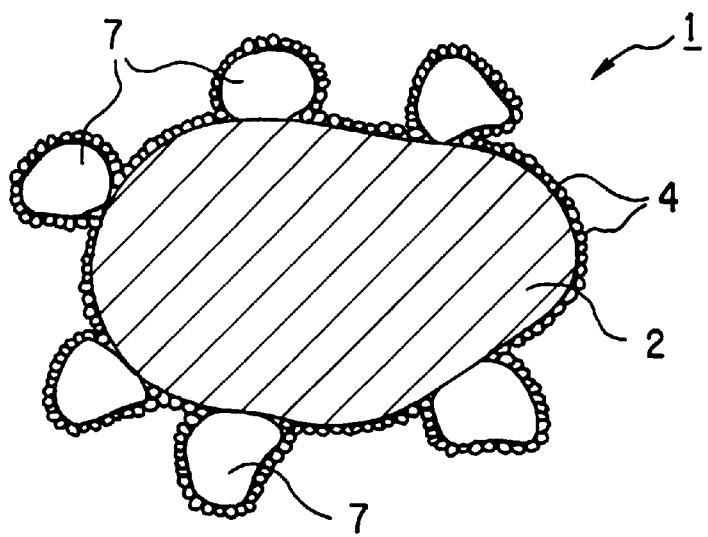
FIG. 4 is a sectional view showing a further example of the aggregate of the present invention.

FIG. 4 shows an example wherein layer surfacing material particles 7 are first put on or sticked to the core 2 partially thereof, followed by applying the adhesive again, thereafter, smaller surfacing material particles are applied, whereby providing larger unevenness. The adhesive is not illustrated in the drawing.

Figure 5A:
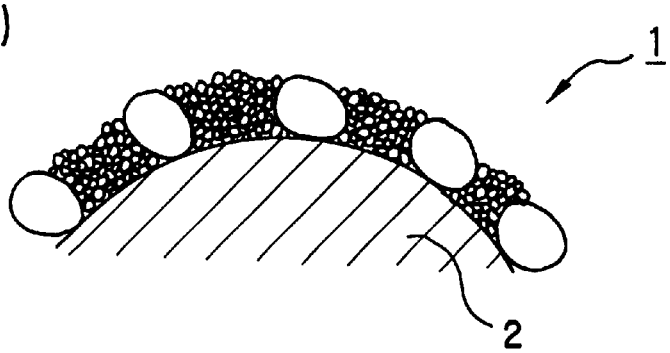
FIG. 5 is a partial sectional view showing a further modified example of the aggregate of the present invention.
Figure 5B:
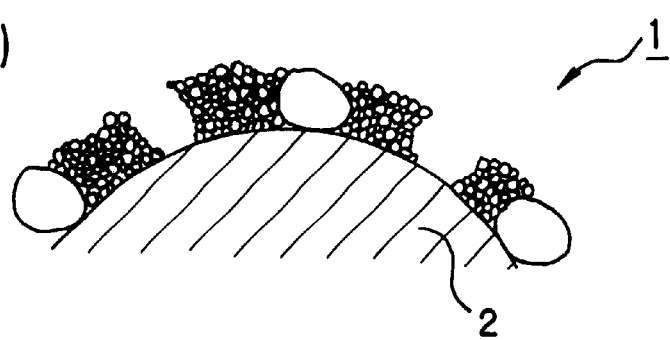

FIG. 5 (in which the adhesive not shown) shows an example that the larger surfacing material particles are first put on or sticked to the core 2, and then, plenty of smaller particles are applied (FIG. 5(a)). In this case, there is no application of the adhesive after the larger surfacing materials are put on the cores 2, so that the smaller surfacing material does not stick to the circumference of the larger ones. Under the above condition, then, blasting (or chemical treatment, dissolution, etc.,) is applied to remove the larger surfacing material (FIG. 5(b)), thereby forming the large unevenness.

EFFECTS OF THE INVENTION

The present invention has the following notable advantages.

(1) The aggregate according to the present invention comprises the elastic aggregate and a number of the surfacing material particles fixed on the circumference of the elastic aggregate, so that the aggregate has an improved physical binding with the set-hard material and even rubber or the like, which is inherently hard to bind with the set-hard material, does cause quite unlikely falling from the set-hard material and cracking.

(2) The aggregate according to the present invention achieves high adhesion between the set-hard material and the elastic aggregate (without the conventional surface treatment such as high frequency bonding, corona discharge treatment, etc.).

(3) The aggregate according to the present invention, when mixed for use in asphalt as paving material, can prevent rubber chips on the pavement surface from being peeled off and scattered by automobiles' tires and improve durability of the pavement surface. The aggregate when mixed for used with concrete, with the surfacing material employing cement powder, does make hydraulic reaction with the set-hard material to firmly interlock therewith.

(4) The resin mortar according to the present invention when used for paving enables rolled fill if required since the surface of the elastic aggregate is prevented, by the surfacing material to some extent, from deforming, and notably improves workability in trowelling. A draining pavement road paved accordingly shows an excellent durability against loads and impact applied by driven automobiles.

(5) Rubber or plastic can be excellently mixed in asphalt, thereby providing asphalt pavement itself with a brand-new physical properties (flexibility, etc.), enabling wider uses or asphalt.

(6) Crushed substances of industrial wastes such as waste tires can be made use of as the cores, thereby facilitating disposal of industrial wastes and solving the environmental problems.

(7) The cores are covered with adhesive. Methods of such covering and adhesives to be adopted may be suitably selected to enable waste plastic such as vinyl chloride, whose use is said to be problematic, to be employed as the aggregate.

What we claimed is:

1. An aggregate to be mixed for use with a hard-set material and comprising a core made of an elastic material and a surfacing material fixed on the core's surface by means of an adhesive.

2. An aggregate as set forth in claim 1 wherein the surfacing material positioned on the outermost surface is not covered, at a part of the surface of the surfacing material, with the adhesive.

3. An aggregate as set forth in claim 1 wherein the surfacing material is mostly not covered by the adhesive.

4. An aggregate as set forth in claim 1 wherein the surfacing material is mostly covered by the adhesive.

5. An aggregate as set forth in any one of claim 1 to 4 wherein the surfacing material is plural in kind each different to one another in size, shape and kind.

6. An aggregate as set forth in claim 1 or 2 wherein the surface of the core has a part not covered with the surfacing material.

7. An aggregate as set forth in any one of claims 1 to 6 wherein the adhesive on the surface of the core has recovering properties from deformation.

8. A manufacturing process of an aggregate comprising such steps as mixing 100 parts by weight of a core made of an elastic material with 0.1 to 20 parts by weight of an adhesive to cause the adhesive to stick uniformly on the surface of the core, and thereafter, contacting and mixing the core with 1 or more part by weight of a surfacing material.

9. A manufacturing process of an aggregate as set forth in claim 8 wherein the surfacing material has one-tenth or less average particle diameter of that of the core and wherein the surfacing material is plural in kind each different to one another in size and shape and kind.

10. A manufacturing process of an aggregate comprising such steps as mixing a core made of an elastic material with an adhesive to cause the adhesive to uniformly stick to the surface of the core, thereafter, contacting the core with a first surfacing material to cause the same to stick to a part of the core's surface, followed by applying again the adhesive on the core surface, and applying thereon a second surfacing material smaller than the first surfacing material.

11. A manufacturing process of an aggregate comprising such steps as mixing a core made of an elastic material with an adhesive to cause the adhesive to uniformly stick to the surface of the core, thereafter, contacting and mixing the core with a second surfacing material, followed by removing the second surfacing material not yet fixed, and then by applying again the adhesive on the core surface, and applying partially thereon a first surfacing material larger than the second surfacing material.

12. A resin mortar prepared by mixing an aggregate as set forth in claim 1 and a resin.

13. A resin mortar prepared by mixing an aggregate as set forth in claim 2 and a resin.

14. A resin mortar prepared by mixing an aggregate as set forth in claim 3 and a resin.

15. A resin mortar prepared by mixing an aggregate as set forth in claim 4 and a resin.

16. A resin mortar prepared by mixing an aggregate as set forth in claim 5 and a resin.

17. A resin mortar as set forth in claim 12 wherein the resin is hydraulic such that it reacts and hardens with water when mixed with water.

18. A resin mortar as set forth in claim 17 wherein the resin is a resin modified with polysulfide.

19. An aggregate as set forth in claim 1, wherein the average particle diameter of the core is 0.2 to 30 mm.

20. An aggregate as set forth in claim 1, wherein the surfacing material is in the form of particles or fibers.

21. An aggregate as set forth in claim 1, wherein the surfacing material is selected from particles of the group consisting of silica sand, cement powder, calcium carbonate, ceramics, microballoons, crushed concrete powder, crushed plastic powder, and fly ash.

22. An aggregate mixed with a hard-set material, wherein said aggregate comprises a core made of an elastic material and a surfacing material fixed on the core's surface by means of an adhesive.

23. An aggregate mixed with a hard-set material as set forth in claim 22, wherein said hard-set material is selected from the group consisting of cement, an asphalt mixture, an asphalt emulsion, a resin and a resin mortar.

* * * * *